United States Patent
Brdiczka et al.

(10) Patent No.: US 9,002,370 B2
(45) Date of Patent: Apr. 7, 2015

(54) METHOD AND SYSTEM FOR DYNAMIC MEETING DETECTION USING MULTIPLE PHYSICAL FEATURES FROM MOBILE DEVICES

(75) Inventors: Oliver Brdiczka, Mountain View, CA (US); Jens Weppner, Kaiserslautern (DE)

(73) Assignee: Palo Alto Research Center Incorporated, Palo Alto, CA (US)

( * ) Notice: Subject to any disclaimer, the term of this patent is extended or adjusted under 35 U.S.C. 154(b) by 296 days.

(21) Appl. No.: 13/528,669

(22) Filed: Jun. 20, 2012

(65) Prior Publication Data

US 2013/0344851 A1    Dec. 26, 2013

(51) Int. Cl.
*H04W 24/00* (2009.01)
*G01S 5/02* (2010.01)
*H04L 12/18* (2006.01)
*H04L 12/58* (2006.01)
*G01S 19/14* (2010.01)

(52) U.S. Cl.
CPC .......... *H04L 12/5815* (2013.01); *G01S 5/0278* (2013.01); *G01S 19/14* (2013.01); *H04L 12/1822* (2013.01); *H04L 12/189* (2013.01)

(58) Field of Classification Search
CPC .. H04W 24/10; H04W 28/0231; H04W 36/00
USPC ............. 455/404.2, 440, 456.1, 456.2, 456.6, 455/459, 457, 461
See application file for complete search history.

(56) References Cited

U.S. PATENT DOCUMENTS

| | | | | |
|---|---|---|---|---|
| 7,167,799 | B1* | 1/2007 | Dolgov et al. | 701/301 |
| 8,862,138 | B2* | 10/2014 | Uusitalo et al. | 455/446 |
| 2008/0201069 | A1* | 8/2008 | Suzuki | 701/204 |
| 2009/0201149 | A1* | 8/2009 | Kaji | 340/539.13 |
| 2011/0009062 | A1* | 1/2011 | Anschutz et al. | 455/41.2 |
| 2011/0319022 | A1* | 12/2011 | Arad et al. | 455/41.2 |
| 2012/0098705 | A1* | 4/2012 | Yost et al. | 342/451 |
| 2012/0226523 | A1* | 9/2012 | Weiss et al. | 705/7.34 |
| 2012/0253819 | A1* | 10/2012 | Hasegawa | 704/270 |

OTHER PUBLICATIONS

Wyatt, Danny et al., "Inferring colocation and conversation networks for privacy-sensitive audio with implications for computational social science", Jan. 2011.
Eagle, Nathan et al., "Reality mining: sensing complex social systems", May 2006.
Choudhury, Tanzeem Khalid "Sensing and Modeling Human Networks", Feb. 2004.

* cited by examiner

*Primary Examiner* — Dai A Phuong
(74) *Attorney, Agent, or Firm* — Shun Yao; Park, Vaughan, Fleming & Dowler LLP

(57) ABSTRACT

One embodiment of the present invention provides a system for detecting in-person meetings between users of mobile devices. During operation, the system collects information regarding characteristics of features of the users' surrounding environment as detected by the mobile devices. The characteristics of the detected features are compared with each other to produce observations and the observations are applied to a hidden Markov model to detect meetings between the users. Features detected from the surroundings may include Wi-Fi signals, discoverable Bluetooth signals, and ambient sounds.

22 Claims, 8 Drawing Sheets

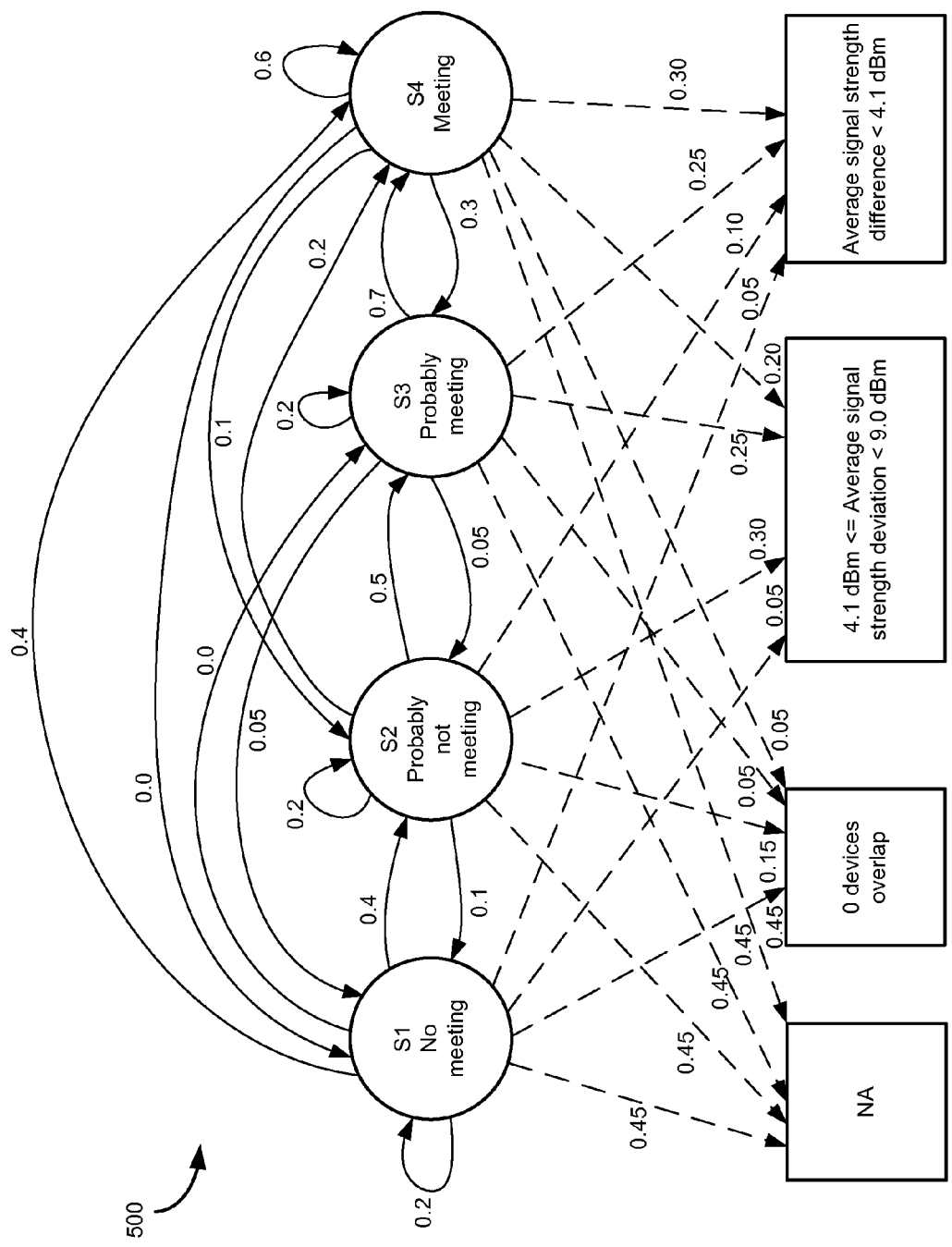
FIG. 5A (Wi-Fi)

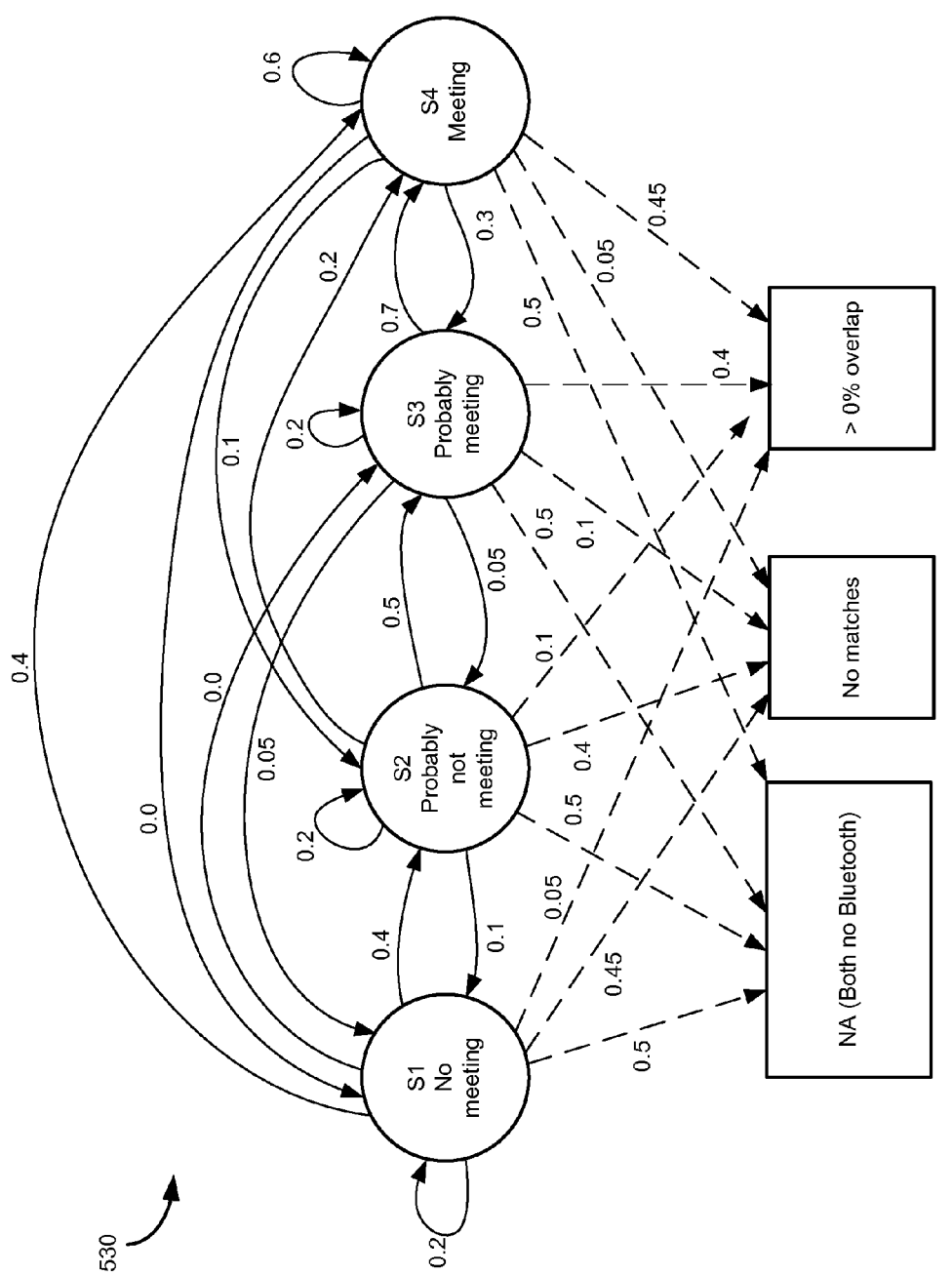
FIG. 5B (Bluetooth)

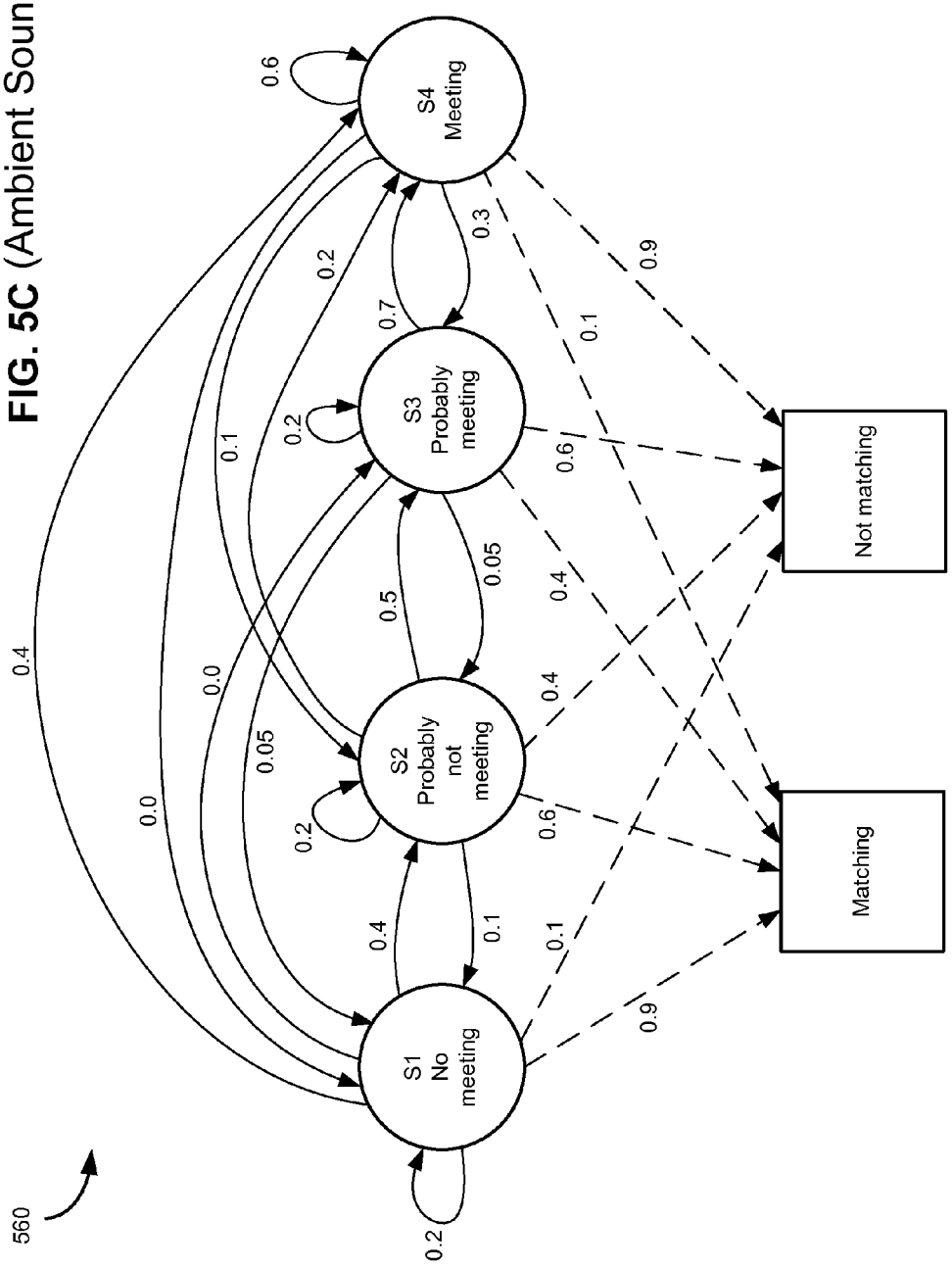

METHOD AND SYSTEM FOR DYNAMIC MEETING DETECTION USING MULTIPLE PHYSICAL FEATURES FROM MOBILE DEVICES

BACKGROUND

1. Field

This disclosure is generally related to detecting in-person meetings between mobile device users. More specifically, this disclosure is related to a method and system for dynamically detecting in-person meetings between mobile device users using features detected from the surrounding environment by the mobile devices.

2. Related Art

Organizations may employ and manage large numbers of people. Such organizations may need to determine whether people are interacting with each other and participating in an in-person meeting. While meeting information may be manually inputted into calendars, large organizations with thousands of employees may waste much valuable time manually administering such calendar information. Further, calendar information may be outdated or incorrect and therefore may not accurately reflect whether employees are actually participating in an in-person meeting.

Several approaches have been proposed to detect co-location of users. Such approaches to detecting co-location may be based on global positioning system (GPS) coordinates derived from the position of mobile phones. Other approaches may utilize wireless local area network (WLAN) localization. Such co-location approaches only detect that users are located near each other but are often insufficient for determining whether the users are interacting with each other in an in-person meeting.

SUMMARY

One embodiment of the present invention provides a system for detecting whether users are participating in an in-person meeting. During operation, the system collects information representing characteristics of a surrounding environment that indicates location and/or distance between two mobile devices, wherein the characteristics are one or more features of surroundings as detected by the two mobile devices associated with the users, and the system determines the presence of an in-person meeting between the users based at least on the collected characteristics information.

In a variation on this embodiment, determining the presence of in-person meeting between the users further involves applying a hidden Markov model (HMM) based on observations of a feature of surroundings.

In a further variation, determining the presence of in-person meeting further involves performing a Viterbi algorithm to produce a meeting-state prediction.

In a further variation, the system further combines all HMM outputs to make an overall prediction.

In a further variation, the characteristics of the surrounding environment include at least one of Wi-Fi signals, Bluetooth devices, GPS signals, or ambient sound samples.

In a variation on this embodiment, the features include detected Wi-Fi signals and the system further compares Wi-Fi signals detected by the devices to produce an observation associated with Wi-Fi signals.

In a variation on this embodiment, the features include detectable ambient sounds and the system further compares differences between ambient sound samples detected by the devices to produce an observation associated with sounds.

In a variation on this embodiment, the features include Bluetooth signals and the system further compares sets of Bluetooth devices discovered by the devices to produce an observation associated with Bluetooth devices.

In a variation on this embodiment, determining the in-person meetings between the users further involves increasing the probability that a third user has a detected in-person meeting with a first user if the first user has a detected in-person meeting with a second user and the second user has a detected in-person meeting with the third user.

BRIEF DESCRIPTION OF THE FIGURES

FIGS. 5A, 5B, and 5C present diagrams illustrating examples of HMMs configured for the respective features, in accordance with an embodiment of the present invention.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of detecting that users are participating in an in-person meeting by analyzing surrounding environment data collected from mobile devices belonging to the users. Such data may include physical characteristics of the surrounding environment such as the strength and availability of wireless local area network (WLAN) access points (e.g., Wi-Fi access points), the presence of discoverable Bluetooth devices, ambient sounds, and GPS signals. The detected features collected from a pair of mobile devices are compared with each other and applied as input to a meeting detection algorithm. In one embodiment, each set of feature data is fed into a hidden Markov model (HMM), which predicts a meeting state corresponding to that feature, each state being one of "no meeting," "probably not meeting," "probably meeting," or "meeting." The individual HMM prediction results corresponding to different environment features are then combined to produce an overall prediction of the meeting state.

An "in-person meeting" is a meeting between two or more persons that are physically present for the meeting. Attendees of an in-person meeting normally may see and hear each other due to their physical proximity to each other. The in-person meeting may be held in a conference room or office or any other suitable location. The attendees of the in-person meeting bring their personal mobile devices with them and it is through these personal mobile devices that the meetings are detected.

Computing Environment

Figure 1:
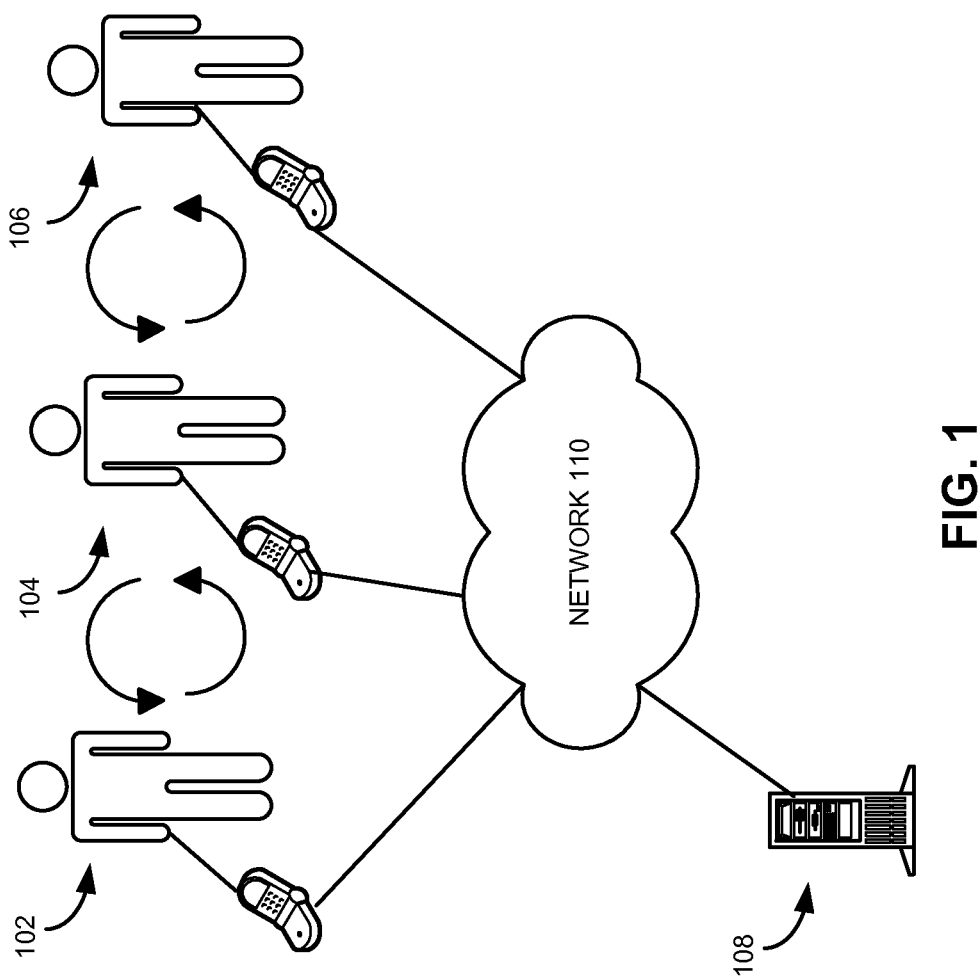
FIG. 1 presents a diagram illustrating a computing environment within which in-person meetings between users may be detected, in accordance with an embodiment of the present invention.

FIG. 1 presents a diagram illustrating a computing environment within which in-person meetings between users may be detected, in accordance with an embodiment of the present invention. In FIG. 1, a user 102 interacts with a user 104 in a meeting. The interaction is an in-person interaction in which the participants of the meeting are physically present. User 104 may also interact with a user 106 in a meeting. The three users may all be participating in the same meeting, and each possesses a mobile device, such as a smartphone. These smartphones may detect characteristics that are features of the surrounding environment, which may include features such as Wi-Fi signals broadcasted from access points, signals broadcasted from Bluetooth devices, sounds coming from the conversations of the users and other background noises, and GPS signals. The smartphones may detect the characteristics of the surrounding environment to send to a server 108 through a network 110. Server 108 determines whether the users are participating in a face-to-face meeting. In one embodiment, server 108 may also utilize other features of the surrounding environment to detect in-person meetings. Server 108 may host a meeting detection system which is described with respect to FIG. 2.

In one embodiment, the meeting detection system detects each of Wi-Fi signals, Bluetooth signals, and ambient sound and compares the detected features to produce one or more observations. The meeting detection system feeds each of the observations into a respective HMM, and performs the Viterbi algorithm to obtain a prediction of meeting state. Note that the Viterbi algorithm operating on the HMM reveals the most probable sequence of meeting state transitions, given a sequence of observations for the feature. The meeting detection system then combines the results of the individual HMM predictions using, for example, a weighted combination method. The combined result is the prediction result for meeting detection.

Figure 2:
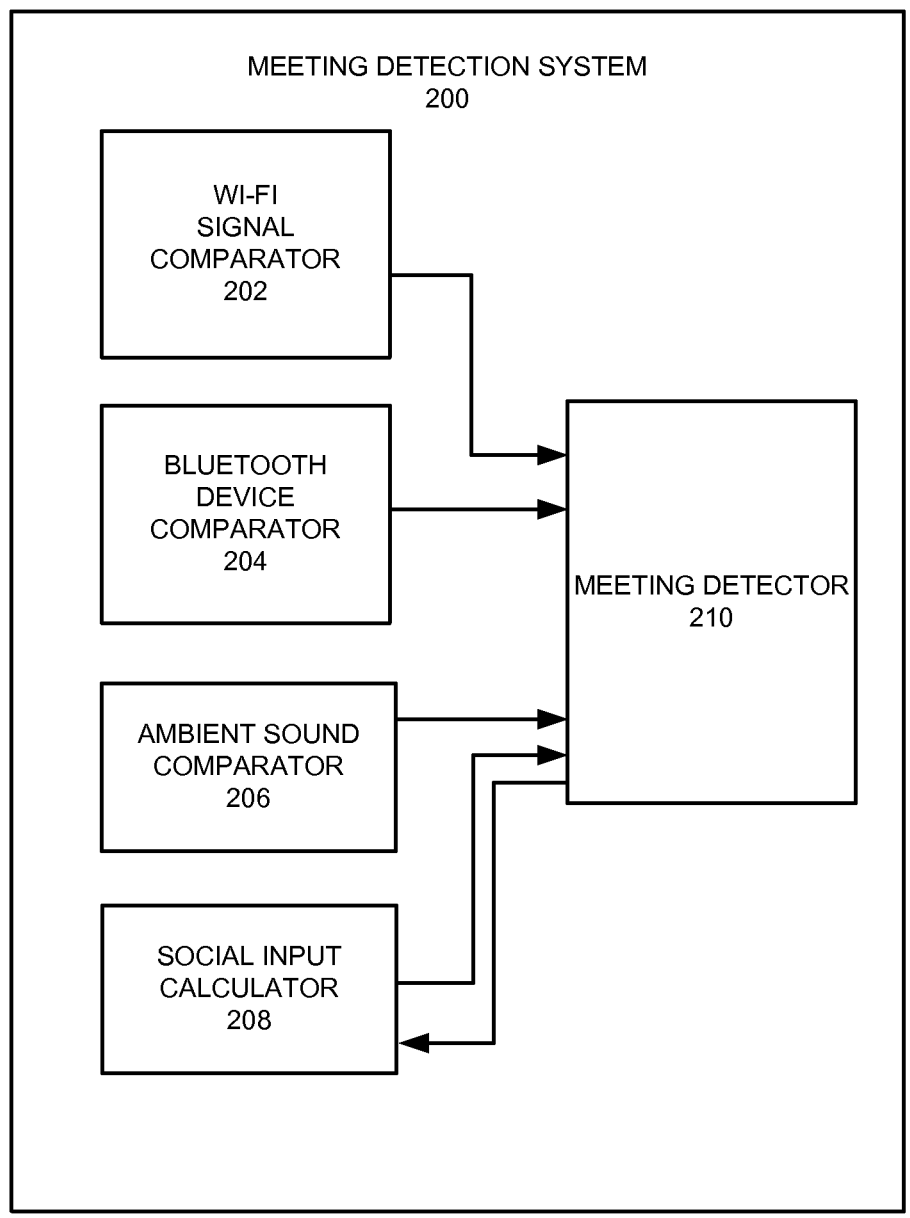
FIG. 2 presents a diagram illustrating a meeting detection system, in accordance with an embodiment of the present invention.

FIG. 2 presents a diagram illustrating a meeting detection system, in accordance with an embodiment of the present invention. Meeting detection system 200 includes a Wi-Fi signal comparator 202, a Bluetooth signal comparator 204, an ambient sound comparator 206, a social input calculator 208, and a meeting detector 210. Note that meeting detection system 200 may reside on a separate server or on one of the mobile devices.

Wi-Fi signal comparator 202 compares the presence and strength of Wi-Fi signals detected by each of two mobile devices. For example, there may be multiple Wi-Fi signals broadcasted from different floors of a building, nearby buildings, homes, or mobile Wi-Fi sources such as smartphones. By comparing the signals received at each mobile device, the relative locations and/or distances of the mobile devices may be determined.

In one embodiment, between predetermined intervals (e.g., 15 seconds), each mobile device scans for Wi-Fi access points and stores the network name (SSID), MAC address, and measured signal strength (e.g., in dBm) of each access point. The meeting detection system 200 compares the two sets of information corresponding to the discovered Wi-Fi access points from each of the mobile devices. The result of comparison may be one of four observations: (1) each set of Wi-Fi access points is empty, meaning both devices did not discover any access points; (2) there is no common Wi-Fi access point detected by the two devices; (3) at least one Wi-Fi access point appears in both sets of discovered Wi-Fi access points, and the perceived signal strengths of the common access points from the two smartphones is within a predetermined range (e.g., 4.1 dBm<=signal strength<9.0 dBm); and (4) the average signal strength difference of all access points is within a predetermined range (e.g., <4.1 dBm).

Bluetooth signal comparator 204 compares sets of discovered Bluetooth devices as detected by each of two mobile devices. Bluetooth signals may be broadcasted by Bluetooth-equipped earpieces, headphones, cell phones, laptops, or other electronic devices. In one embodiment, between predetermined intervals (e.g., 15 seconds) each mobile device scans for discoverable Bluetooth devices and stores the Bluetooth device names and MAC address. The two sets of information corresponding to discovered Bluetooth devices are collected and compared with each other. The result of comparison may be one of three observations: (1) both mobile devices are not recognizing any surrounding Bluetooth devices; (2) there is no common Bluetooth device detected by the two mobile devices, but at least one mobile device recognizes at least one Bluetooth device; and (3) there is at least one common Bluetooth device detected by both mobile devices.

Ambient sound comparator 206 compares audio samples as recorded by each of two mobile devices. Ambient sound may include, for example, the sound of conversations between the meeting participants and background conversations. In one embodiment, the audio samples are extracted from two audio recordings with a predetermined length (e.g., 15 seconds), each audio recording originating from one of the two mobile devices. In one embodiment, for each audio sample, the Perceptual Linear Coefficients (PLP) are computed and transformed into a power spectrum ($10*\log 10(plp)$). The resulting power spectrum is filtered into binary values (via thresholding) for each band. For example, 28 perceptual linear coefficients/bands can be used. In one embodiment, for each band, a power spectrum value less than a threshold value (e.g., threshold value of 30) leads to a zero value and a power spectrum of greater or equal to the threshold value leads to a value of one. As a result, the system obtains two sets of binary values. The system then computes a correlation between these two sets of binary values. In one embodiment, the system computes a Pearson correlation. A correlation result of less than a predetermined threshold (e.g., a Pearson correlation of 0.1) leads to a negative match. A correlation result of greater or equal to the threshold leads to a positive match. The negative match or positive match result is applied as input to a HMM to detect the meeting state between owners of the mobile devices from which the sounds are recorded.

The system uses a HMM configured for each feature to determine the most probable sequence of meeting states based on a sequence of observations. As the system receives the characteristics data between regular predetermined intervals of time (e.g., 15 seconds), the system preprocesses the data to produce observations for the respective HMM. The system inputs the observations to the HMM and uses the Viterbi algorithm to predict meeting states. As the system receives each new observation, the Viterbi algorithm computes a new most probable meeting state.

The system then combines the individual meeting states output from the HMMs corresponding to individual features to produce an overall predicted meeting state. In one embodiment, the system may assign weights to each of the features to produce an overall meeting state prediction that is a combination of the weighted states. In one embodiment, the system can augment each HMM with a social input feature. The system can include the social feature as input to each HMM when applying the Viterbi algorithm to determine the HMM outcome. In a further embodiment, the system may also use GPS signals to detect meetings by configuring an HMM for GPS signals.

Social input calculator 208 applies a transitivity principle to calculate a social input feature which is a potential input variable for each HMM. Generally, if a detected feature (e.g. Wi-Fi signals) from mobile device A and from mobile device B is similar, and the same detected feature from mobile device B and from mobile device C is similar, then the same feature detected by mobile devices A and C should be similar as well. Thus, if there is a meeting detected by a HMM corresponding to a given feature between mobile device A and mobile device B, and there is a meeting detected between mobile device B and mobile device C, then there is also likely a meeting between mobile device A and mobile device C. In one embodiment, the values for this feature as input to the HMM are (1) "social" and (2) "not social," with higher probability to observe "social" in the meeting states of a respective HMM. More details about how the social input feature augments a HMM are described in conjunction with FIG. 4.

Meeting detector 210 then uses the input from Wi-Fi signal comparator 202, Bluetooth device comparator 204, ambient sound comparator 206, and social input calculator 208 and applies the Viterbi algorithm to each HMM corresponding to these features. Each HMM produces its respective meeting-state prediction. Meeting detector 210 then combines these results and produces an overall result.

Detecting In-Person Meetings Between Users

Figure 3:
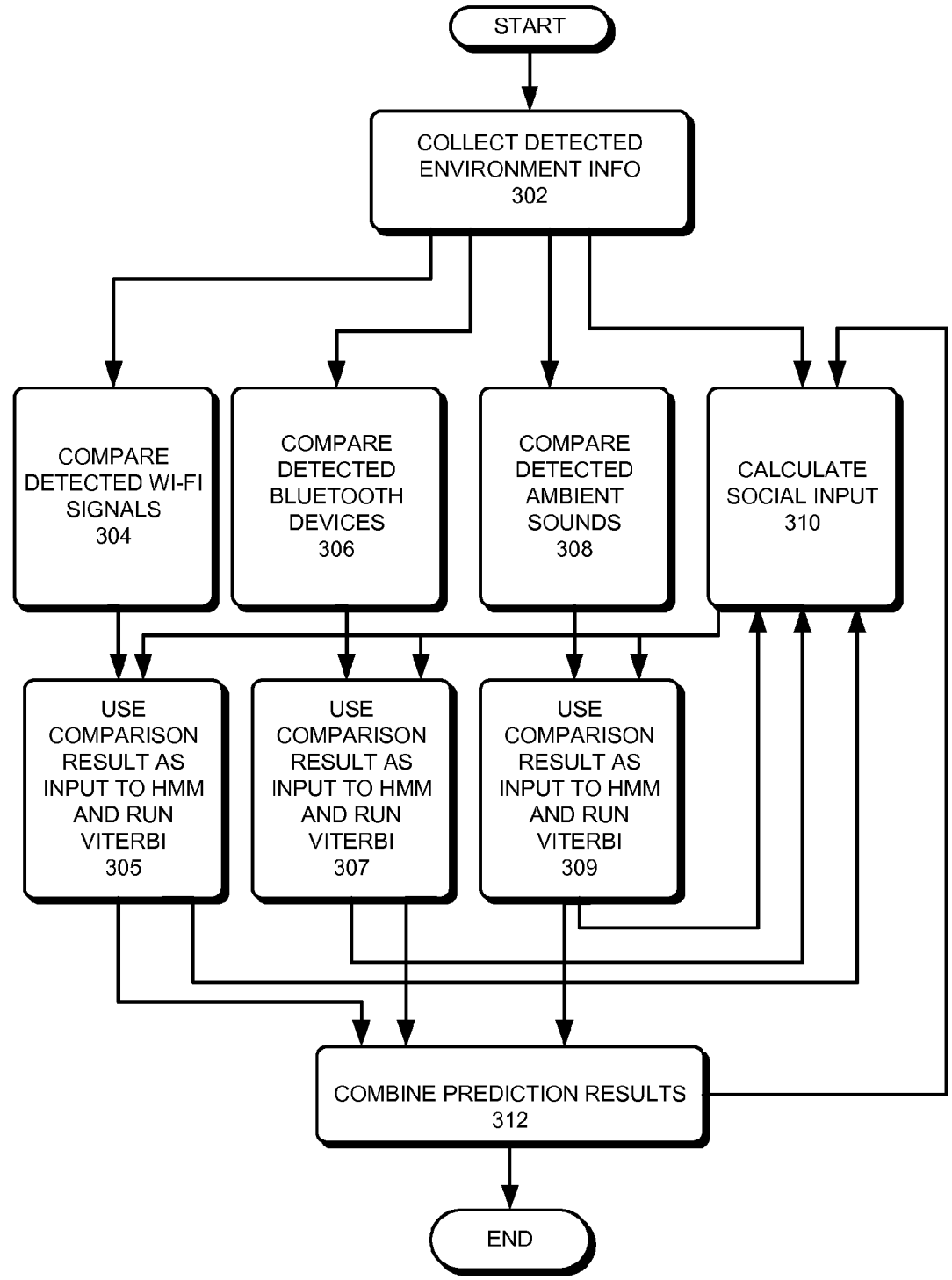
FIG. 3 presents a flow chart illustrating a process of detecting in-person meetings between users, in accordance with an embodiment of the present invention.

FIG. 3 presents a flow chart illustrating a process of detecting in-person meetings between users, in accordance with an embodiment of the present invention. During operation, meeting detection system 200 collects information about the surrounding environment detected by the mobile devices (operation 302). In one embodiment, the system installs client software on the mobile devices that detect and send the feature characteristics data to the meeting detection system 200. The client software records the detected features on each mobile device and sends the recorded features to a central server or cloud service. In one embodiment, a script running on server 108 compares the detected features for each pair of devices. The result of the comparison is an observation for each basic feature. Meeting detection system 200 subsequently inputs the respective observation to a HMM corresponding to that feature.

Meeting detection system 200 compares the characteristics of detected features such as Wi-Fi signals, Bluetooth devices, ambient sounds, and GPS signals to detect meetings. Specifically, meeting detection system 200 compares the presence and strength characteristics of detected Wi-Fi signals to produce observations (operation 304). The system inputs the observations to the HMM for Wi-Fi and runs the Viterbi algorithm (operation 305). Similarly, the system may also run the Viterbi algorithm with the respective HMM for other compared feature inputs. Such other feature input includes sets of Bluetooth devices as detected by each mobile device (operations 306 and 307) and ambient sounds (operations 308 and 309). In one embodiment, the system also includes social features that are detected with HMMs as input back into the HMMs (operation 310). The execution of the Viterbi algorithm with the HMM on the various observations produces a meeting prediction for each feature.

The system combines the prediction results for the features to produce an overall meeting prediction result (operation 312). For example, the system may determine the overall meeting prediction result by majority vote. If the majority of HMMs indicates that there is a meeting, then the system determines that there is a meeting associated with the mobile devices. In one embodiment, the system may be configured to give a greater weight to a particular feature. For example, the system may give greater weight to the meeting state prediction of the HMM for the ambient sound feature.

Utilizing Social Features to Detect Meetings

Figure 4:
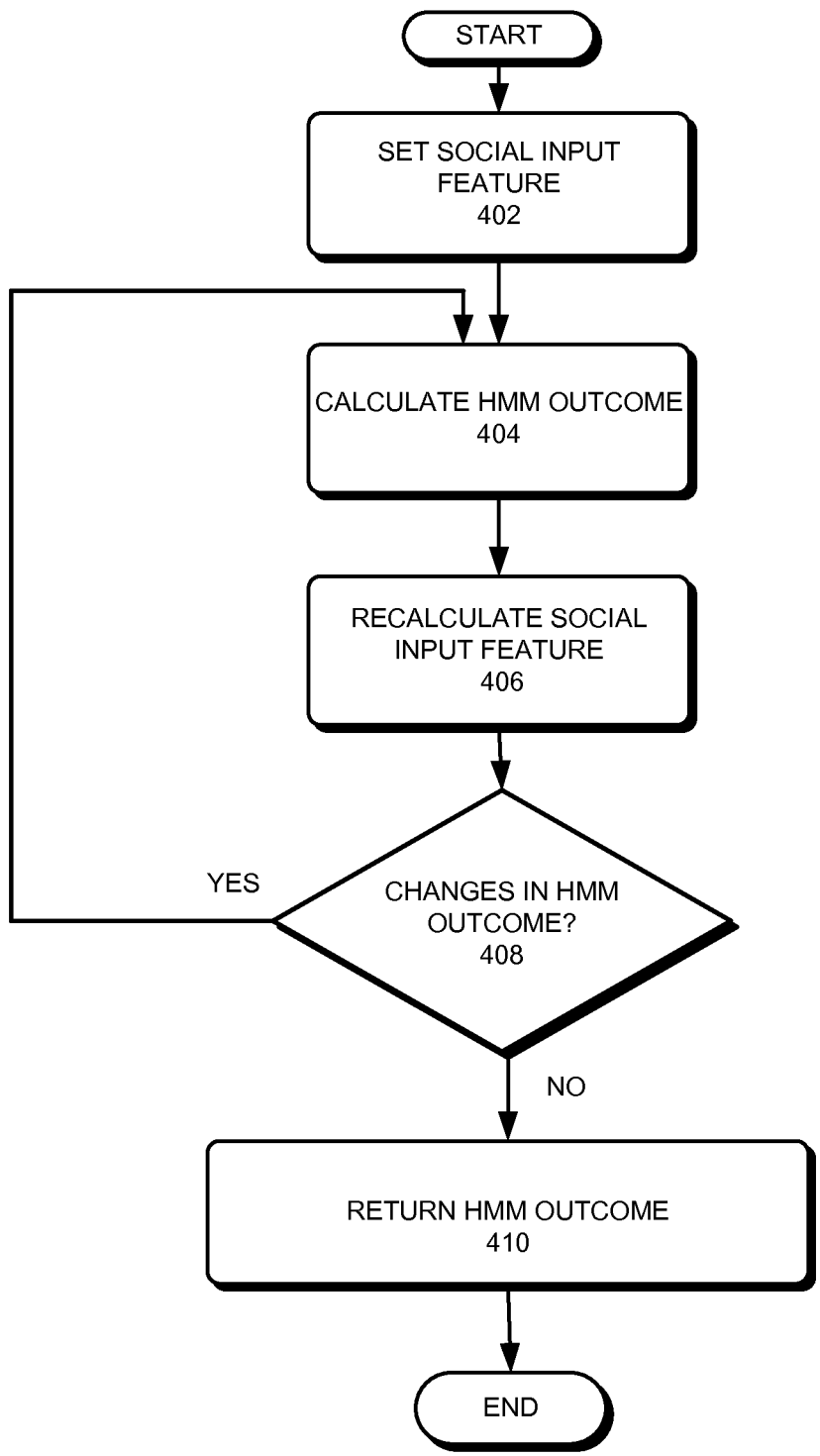
FIG. 4 presents a flow chart illustrating how to use a social input feature with a respective HMM, in accordance with an embodiment of the present invention.

FIG. 4 presents a flow chart illustrating how to use a social input feature with a respective HMM, in accordance with an embodiment of the present invention. The social input feature is a potential input variable for a respective HMM corresponding to an environment feature, but calculation of the social input also relies on the output of HMMs. In one embodiment, meeting detection system 200 executes the steps of FIG. 4 in a subroutine to return an HMM outcome. In one embodiment, meeting detection system 200 may execute an iterative algorithm to utilize social features as input to a HMM. During operation, the meeting detection system 200 initially sets the social input features for the HMM to "not social" (operation 402). Subsequently, the system applies the Viterbi algorithm to calculate the HMM outcome for the input combination of social input and feature characteristics as detected by the mobile devices (operation 404). Based on the outcome of the HMM, the system sets the social input feature to "social" for the HMM between mobile devices A and C if and only if there is a mobile device B with a HMM between mobile devices A and B showing a "meeting" state and a HMM between mobile devices B and C showing a "meeting" state (operation 406). Otherwise, the social input feature is set to "not social" for the HMM between mobile devices A and C. The system determines whether there are any changes in the HMM outcome as compared to the previous iteration of the algorithm (operation 408). If there are changes in the HMM outcome, operations 404 and 406 are repeated until the system detects no changes in the outcome of the HMM or until a certain number of loops have been executed. If there are no changes in the HMM outcome, meeting detection system 200 has completed computations for the outcome of the respective HMM with the social input feature. In one embodiment, the system returns the computed HMM outcome as a meeting prediction value of the subroutine (operation 410). The system combines the HMM outcomes computed with respect to the different environment features to determine the overall meeting prediction result.

Example HMMs for Detecting In-Person Meetings

FIGS. 5A, 5B, and 5C present diagrams illustrating examples of HMMs configured for the respective features, in accordance with an embodiment of the present invention. FIGS. 5A, 5B, and 5C and the Tables 1-3 below together illustrate example HMMs with emission probabilities and transition probabilities. Note that the basic idea in the configuration of each HMM is to have observations (e.g., comparison results or similarity states) with no available detected features mapped with equal probabilities to all meeting states, while observations reflecting higher similarity of Wi-Fi access point strength or Bluetooth signal visibility are mapped with higher probability to meeting states such as the "probably meeting" state S3 and the "meeting" state S4. In one embodiment, the configuration of a HMM is such that transitions are possible between all states, the probability to move towards meeting states are higher, and self-transition probabilities are high.

HMM 500 for Wi-Fi, HMM 530 for Bluetooth, and HMM 560 for ambient sounds each includes four states: (1) "no meeting" state S1 indicates that the owners of the two mobile devices are not interacting in a meeting; (2) "probably not meeting" state S2 indicates that the owners of the two mobile devices are probably not in a meeting; (3) "probably meeting" state S3 indicates that the owners of the two mobile devices are probably in a meeting; (4) "meeting" state S4 indicates that the owners of the two mobile devices are in a meeting. Having four states in the HMM allows for additional smoothing of fluctuations in the observed similarity states and values (e.g., when a feature on one mobile device becomes unavailable, or an outlier value is measured). Arrows pointing from one state to another indicate the transitions between the states with the probability of such transitions.

In one embodiment, the meeting detection system 200 uses the Viterbi algorithm to predict meeting states. The Viterbi algorithm accepts as input the observed similarity states or values. In one embodiment, the features of detected GPS signals and/or calculated social input are also included in the input to the algorithm. The output of the Viterbi algorithm is the most probable sequence of HMM states for the given input sequence of similarity states or values that form the observations. For example, the output sequence may be "no meeting, probably not meeting, probably meeting, probably meeting, meeting, meeting, probably meeting," for a sequence of 15-second intervals. In one embodiment, the state outputs of all HMMs for all pairs of mobile devices are computed to determine all ongoing meetings.

Tables 1 to 3 list example emission probabilities for each of the HMM states.

TABLE 1

| Probability (Wi-Fi) | S1 | S2 | S3 | S4 |
|---|---|---|---|---|
| NA (both no Wi-Fi) | 0.45 | 0.45 | 0.45 | 0.45 |
| 0 devices overlap | 0.45 | 0.15 | 0.05 | 0.05 |
| 4.1 dBm <=Signal strength deviance <9.0 dBm | 0.05 | 0.30 | 0.25 | 0.20 |
| Signal strength deviance <4.1 dBm | 0.05 | 0.10 | 0.25 | 0.30 |

TABLE 2

| Probability (Bluetooth) | S1 | S2 | S3 | S4 |
|---|---|---|---|---|
| NA (both no Bluetooth) | 0.50 | 0.50 | 0.50 | 0.50 |
| No matches | 0.45 | 0.40 | 0.10 | 0.05 |
| >0% overlap | 0.05 | 0.10 | 0.40 | 0.45 |

TABLE 3

| Probability (Sound) | S1 | S2 | S3 | S4 |
|---|---|---|---|---|
| Matching | 0.90 | 0.60 | 0.40 | 0.10 |
| Not matching | 0.10 | 0.40 | 0.60 | 0.90 |

Figure 6:
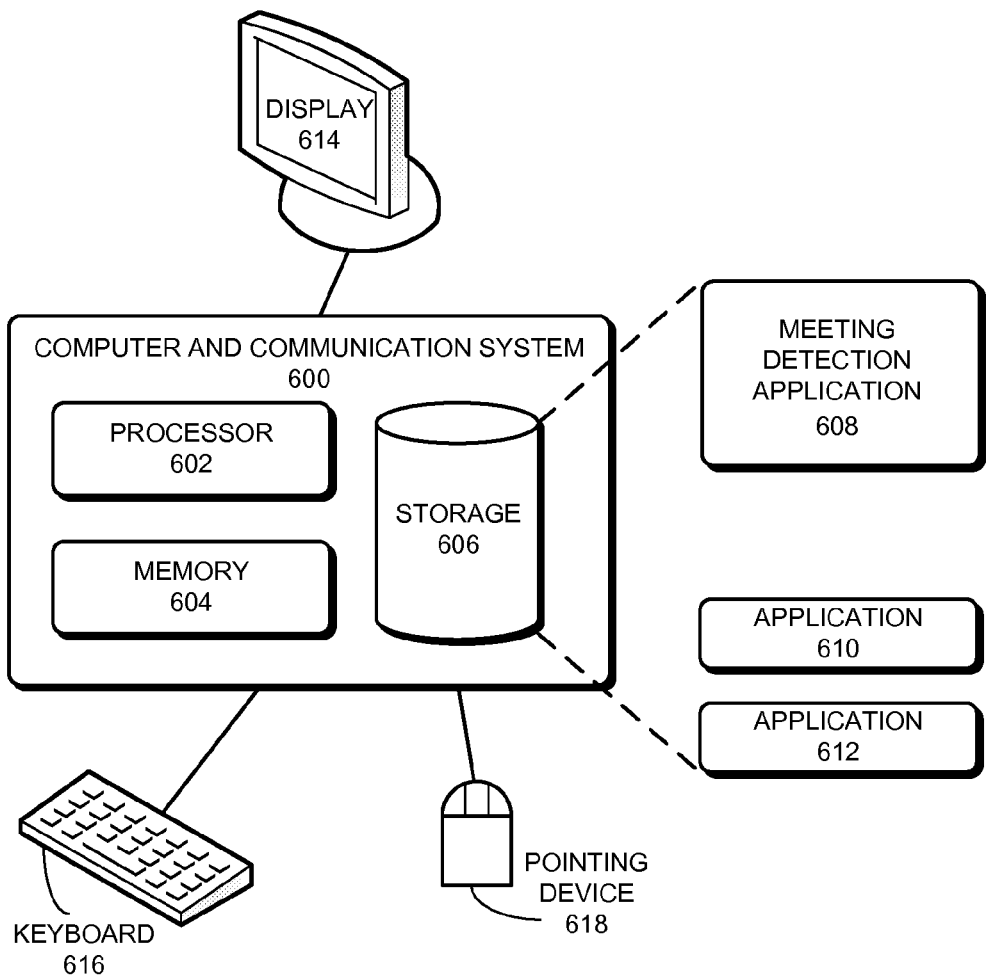
FIG. 6 illustrates an exemplary computer system for detecting meetings between users, in accordance with one embodiment of the present invention.

FIG. 6 illustrates an exemplary computer system for detecting meetings between users, in accordance with one embodiment of the present invention. In one embodiment, a computer and communication system 600 includes a processor 602, a memory 604, and a storage device 606. Storage device 606 stores a meeting detection application 608, as well as other applications, such as applications 610 and 612. During operation, meeting detection application 608 is loaded from storage device 606 into memory 604 and then executed by processor 602. While executing the program, processor 602 performs the aforementioned functions. Computer and communication system 600 is coupled to an optional display 614, keyboard 616, and pointing device 618.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for detecting in-person meetings between users, the method comprising:
obtaining, by a server, feature information representing characteristics of a surrounding environment detected by two mobile devices associated with the users, and that indicates a location and/or distance between the two mobile devices, wherein the characteristics include Wi-Fi signals detected by the two mobile devices;
producing, by the server, input observations to a hidden Markov model from the collected characteristics information, which involves comparing the Wi-Fi signals detected by the two mobile devices to produce the input observation associated with Wi-Fi signals; and
determining, by the server, the presence of an in-person meeting between the users, which involves applying the hidden Markov model comprising a plurality of states that each reflect a meeting state, wherein the hidden Markov model includes at least a state indicating that the users are not in a meeting, and a state indicating that the users are in a meeting.

2. The method of claim 1, wherein determining the presence of the in-person meeting between the users further involves applying the hidden Markov model based on observations of a feature of surroundings.

3. The method of claim 2, wherein determining the presence of the in-person meeting further involves performing a Viterbi algorithm to produce a meeting-state prediction.

4. The method of claim 2, further comprising combining all hidden Markov model outputs to make an overall prediction.

5. The method of claim 1, wherein the characteristics of the surrounding environment also include at least one of Bluetooth devices, global positioning system signals, or ambient sound samples.

6. The method of claim 1, wherein the features include detectable ambient sounds and wherein the method further comprises comparing differences between ambient sound samples detected by the devices to produce an observation associated with sounds.

7. The method of claim 1, wherein the features include Bluetooth signals and wherein the method further comprises comparing sets of Bluetooth devices discovered by the devices to produce an observation associated with Bluetooth devices.

8. The method of claim 1, wherein determining the in-person meetings between the users further involves increasing the probability that a third user has a detected in-person meeting with a first user if the first user has a detected in-person meeting with a second user and the second user has a detected in-person meeting with the third user.

9. A non-transitory computer-readable storage medium storing instructions that when executed by a computer cause the computer to perform a method for detecting in-person meetings between users, the method comprising:
    obtaining feature information representing characteristics of a surrounding environment detected by two mobile devices associated with the users, and that indicates a location and/or distance between the two mobile devices, wherein the characteristics include Wi-Fi signals detected by the two mobile devices;
    producing input observations to a hidden Markov model from the collected characteristics information, which involves comparing the Wi-Fi signals detected by the two mobile devices to produce the input observation associated with Wi-Fi signals; and
    determining the presence of an in-person meeting between the users, which involves applying the hidden Markov model comprising a plurality of states that each reflect a meeting state, wherein the hidden Markov model includes at least a state indicating that the users are not in a meeting, and a state indicating that the users are in a meeting.

10. The computer-readable storage medium of claim 9, wherein determining the presence of the in-person meeting between the users further involves applying the hidden Markov model based on observations of a feature of surroundings.

11. The computer-readable storage medium of claim 10, wherein determining the presence of the in-person meeting further involves performing a Viterbi algorithm to produce a meeting-state prediction.

12. The computer-readable storage medium of claim 10, wherein the computer-readable storage medium stores additional instructions that, when executed, cause the computer to perform additional steps comprising combining all hidden Markov model outputs to make an overall prediction.

13. The computer-readable storage medium of claim 1, wherein the characteristics of the surrounding environment also include at least one of Bluetooth devices, global positioning system signals, or ambient sound samples.

14. The computer-readable storage medium of claim 9, wherein the features include detectable ambient sounds and wherein the computer-readable storage medium stores additional instructions that, when executed, cause the computer to perform additional steps comprising comparing differences between ambient sound samples detected by the devices to produce an observation associated with sounds.

15. The computer-readable storage medium of claim 9, wherein the features include Bluetooth signals and wherein the computer-readable storage medium stores additional instructions that, when executed, cause the computer to perform additional steps comprising comparing sets of Bluetooth devices discovered by the devices to produce an observation associated with Bluetooth devices.

16. The computer-readable storage medium of claim 9, wherein determining the in-person meetings between the users further involves increasing the probability that a third user has a detected in-person meeting with a first user if the first user has a detected in-person meeting with a second user and the second user has a detected in-person meeting with the third user.

17. A computing system for detecting in-person meetings between users, the system comprising:
    one or more processors,
    a non-transitory computer-readable medium coupled to the one or more processors having instructions stored thereon that, when executed by the one or more processors, cause the one or more processors to perform operations comprising:
    obtaining feature information representing characteristics of a surrounding environment detected by two mobile devices associated with the users, and that indicates a location and/or distance between the two mobile devices, wherein the characteristics include Wi-Fi signals detected by the two mobile devices;
    producing input observations to a hidden Markov model from the collected characteristics information, which involves comparing the Wi-Fi signals detected by the two mobile devices to produce the input observation associated with Wi-Fi signals; and
    determining the presence of an in-person meeting between the users, which involves applying the hidden Markov model comprising a plurality of states that each reflect a meeting state, wherein the hidden Markov model includes at least a state indicating that the users are not in a meeting, and a state indicating that the users are in a meeting.

18. The computing system of claim 17, wherein determining the presence of the in-person meeting between the users further involves applying the hidden Markov model based on observations of a feature of surroundings.

19. The computing system of claim 18, wherein determining the presence of the in-person meeting further involves performing a Viterbi algorithm to produce a meeting-state prediction.

20. The computing system of claim 18, wherein the computer-readable storage medium stores additional instructions that, when executed, cause the one or more processors to perform additional steps comprising combining all hidden Markov model outputs to make an overall prediction.

21. The computer system of claim 17, wherein the characteristics of the surrounding environment also include at least one of Bluetooth devices, global positioning system signals, or ambient sound samples.

22. The computing system of claim 17, wherein the features include detectable ambient sounds and wherein the computer-readable storage medium stores additional instructions that, when executed, cause the one or more processors to perform additional steps comprising comparing differences between ambient sound samples detected by the devices to produce an observation associated with sounds.

* * * * *